Aug. 22, 1933. G. A. WOOD 1,923,290
AIRPLANE CONTROL
Filed Sept. 3, 1929 2 Sheets-Sheet 1

Inventor
Garfield A. Wood
By Livnance and
Van Antwerp.
Attorneys

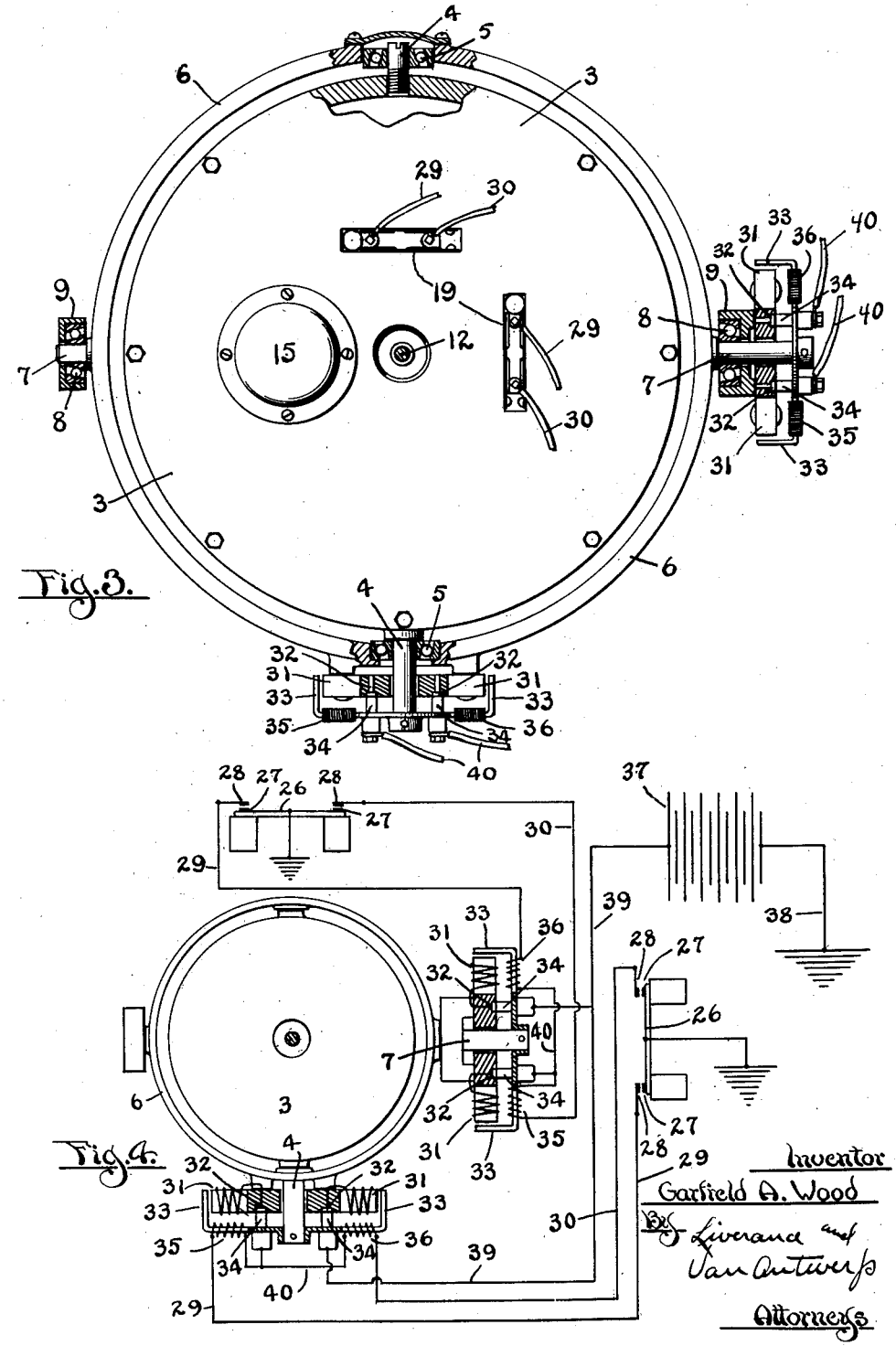

Patented Aug. 22, 1933

1,923,290

UNITED STATES PATENT OFFICE 1,923,290

AIRPLANE CONTROL

Garfield A. Wood, Algonac, Mich.

Application September 3, 1929. Serial No. 390,154

16 Claims. (Cl. 244—29)

This invention relates to improvements in controls and more particularly to means for automatically controlling the stability of a carrier by use of a gyroscope, as for instance an airplane.

The invention is not intended to be utilized to steer the airplane in any way but is intended to stabilize or maintain its equilibrium and for this purpose it is intended to utilize the conventional control lever which acts upon the elevator of the plane in its forward and back movements and upon the ailerons in its crosswise movements and it is intended to utilize a gyroscope to actuate the control lever and preferably an automatically controlled gyroscope of the nature described in my copending patent application filed September 3, 1929, bearing Serial No. 390,153. It is also intended that the control lever may be disconnected from the gyroscope at will and manually operated without regard to the gyroscope when so desired.

Further objects and various details of the invention are hereinafter more fully described and particularly pointed out in the claims, reference being had to the accompanying drawings, in which, Fig. 1 is a vertical sectional elevation of a device embodying my invention shown in its proper relation to the pilot's seat of an airplane with the control lever in place.

Fig. 3 is a plan view of the device as shown in Fig. 1 with parts broken away, and Fig. 4 is an electric wiring diagram of the same.

Like reference characters refer to like parts in the different figures of the drawings.

Figure 1:
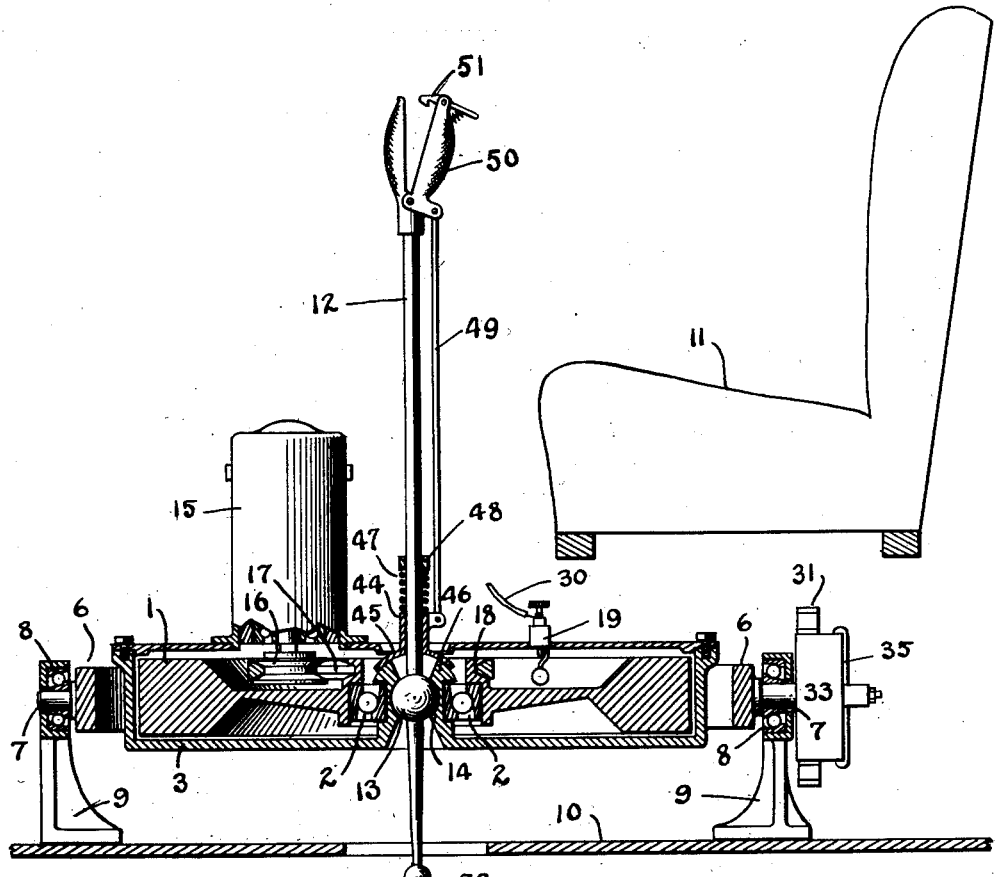
Figure 2:
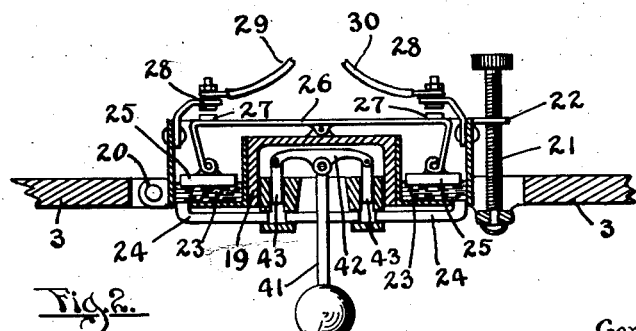
Fig. 2 is an enlarged sectional elevation of one of the automatic leveling devices of the gyroscope.

The gyroscope comprises a conventional rotor or disk 1 mounted for easy and rapid rotation upon a ball bearing 2 supported in a housing 3 and the housing has a gimbal mounting for universal swinging movement having trunnion 4 rotatably mounted in ball bearings 5 in a gimbal ring 6 which has trunnion 7 arranged at right angles to the trunnion 4 and mounted in ball bearings 8 in standards 9. The standards 9 support the device and are suitably mounted in the airplane as upon the floor 10 thereof adjacent the pilot's seat 11.

The control lever 12 must be mounted for universal swinging movement and in this construction it extends through the ball bearing 2 of the gyroscope disk 1, which ball bearing is made large enough to receive it, and the lever is provided with a ball 13 intermediate its ends, which ball is mounted in a socket 14, the center of the ball and socket being coincident with the point at which the axes of the trunnion 4 and 7 cross.

The gyroscope disk 1 may be rotated by any suitable means such as an electric motor 15 mounted on the housing 3 and provided with a pulley 16 over which a belt 17 passes, the belt also passing around a pulley 18 formed on the hub of the gyroscope disk. It is to be understood that any other suitable means for rotating the disk 1 may be substituted for the motor and belt drive herein shown.

The normal action of the gyroscope is to remain in a fixed plane which plane is not relative to the earth and because of the fact that an airplane must be stabilized relative to the earth's surface it becomes necessary to provide means for maintaining the gyroscope with fixed relation to the earth's surface when it is utilized to control the airplane. For this purpose, as previously stated, means for maintaining the plane of the gyroscope relative to the earth's surface are utilized similar to that disclosed in my copending application heretofore identified.

This means comprises two leveling devices 19 mounted on the housing 3 of the gyroscope and each arranged at right angles to the axis of a respective pair of trunnions 4 and 7 and these leveling devices coact as hereafter described, with motors or actuating mediums, one of which is provided for each of one of the trunnions 4 and 7, these motors acting upon the trunnions to rotate them in one direction or the other to effect the position of the gyroscope.

Each of the leveling devices comprises a body 19, which is pivotally mounted at 20 on the housing 3 and is provided with an adjusting screw 21 which is threaded through an extension 22 on the body 19 and is rotatably connected at its other end to the housing 3 whereby the position of the leveling device may be regulated relative to the housing 3. The leveling device is provided with two pockets 23 connected by a passage 24 which communicates with the bottoms of the pockets and the pockets and passage contain a fluid, preferably mercury, which is acted upon, and flows, by gravity. A float 25 is located in each pocket and floats upon the mercury therein and the floats are attached to opposite ends of a rocking contact bar 26 pivotally mounted at its center to the body 19. The contact bar 26 is provided near each of its ends with a contact point 27 and an insulated fixed contact point 28 is arranged over each contact point 27 to be engaged thereby and electric conductors 29 and 30 extend from fixed contact points 28 forming a part of the electric circuit hereafter described. The contact bar 26 is also in the electric circuit preferably by being mounted for electric conductivity whereby it is grounded in the circuit.

Each of the motors at the trunnion 4 and 7 includes a ring armature 31 having commutator segments 32, field magnets having pole pieces 33 arranged adjacent the periphery of the armature and brushes 34 in engagement with the commutator segments 32. Each field magnet is provided with two windings 35 and 36 which are reversely wound whereby the rotation of the motor may be reversed. These aforementioned motor elements, although designed for this particular purpose somewhat different than conventional motor construction, are of ordinary electric motor principle and therefore need no further explanation. The motor for the trunnion 4 has its armature fixed to the gimbal ring 6 and its field magnet fixed to the trunnion 4 which extends through the armature whereby actuation of the motor tends to rotate the gyroscope housing 3 in one direction or the other relative to the gimbal ring 6 and the motor for the trunnion 7 has its armature fixed to a standard 9 and its field magnet fixed to the trunnion 7 whereby the actuation of the motor tends to rotate the gimbal ring 6 relative to the standard in one direction or the other. In this manner, and because of the fact that the motors actuate on axes at right angles to each other, the level of the gyroscope may be perfectly adjusted in any direction.

The mercury in each leveling device being affected by gravity, will flow from one pocket 23 to the other when the leveling device assumes an unlevel position and in so doing the floats 25 will rock the contact bar 26 to engage a pair of contact points 27 and 28 at one end or the other of the leveling device thus closing an electric circuit. Referring to Fig. 4, 37 represents the source of energy for the electric circuit, one pole of which is grounded at 38 whereby circuit is completed to each of the contact bars 26 of the leveling device. The other pole of the source of energy is connected to a conductor 39 which leads to one of the brushes 34 of each of the motors from which the current passes through a commutator segment 32 and thence through the commutator windings of the motor to the other brush 34 through a commutator segment 32 from which a conductor 40 branches to the two reversely wound field windings 35 and 36. The conductors 29 and 30 leading from the respective fixed contacts 28 of the respective leveling devices extend to the respective field windings 35 and 36 and thereby, when the circuit is closed through one pair or the other of contact points 27 and 28, the current flows through one or the other of the field windings 35 or 36 and also through the armature windings as heretofore described and actuates the motor to turn in one direction or the other.

From the foregoing description it will be seen that the leveling devices will automatically control and maintain the plane of the gyroscope with relation to the earth as desired. The plane of the gyroscope need not necessarily be level with the earth's surface as the leveling devices may be adjusted by means of the screws 21 so that they are angularly arranged relative to the gyroscope, and the gyroscope will therefore be maintained in a position where the leveling devices themselves are level with respect to the earth but the gyroscope itself will assume an angle relative to the earth the same as the leveling device is adjusted relative to the gyroscope.

It is intended that this device be automatically leveled by action of gravity only and that centrifugal force shall have no effect upon it and for this purpose a weighted arm 41 is pivotally hung in the body of each leveling device and the arm 41 has a cross arm 42 to each end of which is attached a valve 43 adapted to move into the passage 24 to close it. When the device is affected by gravity only the arm 41 will hang downward in which position the valves 43 will both be out of the passage 24 and will not obstruct the flow of fluid therethrough but, upon action of centrifugal force, as when the airplane may fly in a curve, the weighted arm 41 will swing in one direction or another on its pivot and move one or the other of the valves 43 into the passage 24 and close it thereby preventing the fluid from flowing from one pocket 23 to another by centrifugal action. Upon cessation of the centrifugal force the weighted arm 41 will return to a depending position moving the valves 43 out of the passage 24 and permit the fluid to flow from one pocket to the other by action of gravity.

The control lever 12 is provided with a manually releasable friction clutch by means of which it may be connected or disconnected with the gyroscope. The friction clutch comprises a sleeve 44 slidable upon the lever 12 and having a dish-shaped flange 45 adapted to frictionally engage a convex friction surface 46 on the gyroscope housing. A spring 47, seated against a fixed collar 48, thrusts the friction disk into frictional engagement and a release rod 49 connected to a hand grip 50 enables the operator to release the frictional engagement and free the control lever from the gyroscope. A latch 51 is preferably provided so that the friction clutch may be retained in released position.

The lower end 52 of the control lever 12 is connected in a suitable and conventional manner to the elevator and the ailerons of the airplane and by means of its ball and socket mounting in the gyroscope housing, when released, it may be manually swung in any direction which is necessary for control of the airplane and when clutched to the gyroscope, the gyroscope itself being mounted on right angle axes coincident with the ball and socket of the lever, also provides the same universal swinging movement.

By means of this device the stability of an airplane may be automatically controlled. The pilot may unclutch the control lever from the gyroscope in taking off from the ground and manually control the airplane until it is in the air after which he may release the latch 51 and clutch the lever 12 to the gyroscope upon which the gyroscope itself manipulates the control lever and the gyroscope, being automatically maintained in a fixed plane relative to the earth, immediately detects and corrects any deflection in the airplane's position, either longitudinally aft or transversely. In performing its function the gyroscope, which itself remains in fixed position relative to the earth, also maintains the plane's control members, including the elevator and ailerons, in fixed position relative to the earth and any movement of the airplane itself out of proper equilibrium will immediately be corrected by action of its elevator and ailerons. In this manner the airplane itself corrects its own fluctuations because its control members are maintained in constant proper position and deviation of the airplane changes its relation to its control members which immediately correct the position.

If it is desired to have the plane fly in a banked position then one of the levelling devices 19 may be adjusted by its adjusting screw 21 to cause the gyroscope to assume the desired angle in which the plane is to fly and likewise the longitudinal flying angle of the plane may be regulated by adjusting the proper leveling device. It is conceived that the leveling device may be adjusted either manually or automatically by a suitable device provided for that purpose and that a proper mechanism may be provided for controlling the longitudinal leveling device whereby the airplane may be caused to automatically take off from the ground and elevate itself to the desired altitude and when desired may also act to control the descent of the airplane to the ground and properly land it.

The plane may also be caused to fly in a banked position or in a longitudinal inclined position by manual adjustment of the control lever relative to the gyroscope. The clutch 45 may be released and the control lever 12 manually turned to an angle either transversely or longitudinally relative to the gyroscope and the clutch reengaged which will cause the airplane to maintain an inclined position as long as the clutch remains engaged in this position.

I claim:

1. The combination with an airplane of a gyroscope mounted therein, a control lever connected with means on the airplane for controlling the lateral and longitudinal movements thereof, said control lever extending through the axis of the gyroscope and means for connecting the control lever to the gyroscope whereby the control lever is automatically actuated by the gyroscope.

2. The combination with an airplane of a gyroscope mounted therein for universal swinging movement, a control lever extending through the axis of the gyroscope and connected with means on the airplane for controlling its lateral and longitudinal movements and means for connecting said control lever to said gyroscope whereby said control lever is automatically actuated by the gyroscope.

3. The combination with an airplane of a gyroscope mounted therein for universal swinging movement, a control lever extending through the axis of the gyroscope and connected with means on the airplane for controlling its lateral and longitudinal movements and means for connecting said control lever to said gyroscope whereby said control lever is automatically actuated by the gyroscope, and means affected by gravity and acting upon the gyroscope to maintain its position in fixed relation to the earth.

4. The combination with an airplane of a gyroscope hung on two axes arranged at right angles to each other, a control lever extending through the axis of the gyroscope and mounted therein for universal movement about a center coincident with the crossing of the two axes on which the gyroscope is hung, said control lever being connected to means on the airplane for controlling its lateral and longitudinal movements and means for connecting or disconnecting the control lever with the gyroscope whereby the gyroscope will automatically actuate the control lever or the control lever may be manually actuated.

5. The combination with an airplane of a gyroscope hung on two axes arranged at right angles to each other, a control lever extending through the axis of the gyroscope and mounted therein for universal movement above a center coincident with the crossing of the two axes on which the gyroscope is hung, said control lever being connected to means on the airplane for controlling its lateral and longitudinal movements and means for connecting or disconnecting the control lever with the gyroscope whereby the gyroscope will automatically actuate the control lever or the control lever may be manually actuated, and means affected by gravity and acting upon the gyroscope to maintain its position with fixed relation to the earth.

6. The combination with an airplane having means to control the lateral and longitudinal movements thereof, of a gyroscope connected to actuate said control means, means affected by gravity and acting upon the gyroscope to maintain its position with relation to the earth, and means for adjusting said gravity affected means whereby the position of the gyroscope may be varied with relation to the earth.

7. The combination with an airplane having means to control the lateral and longitudinal movements thereof, of a gyroscope connected to actuate said control means, means affected by gravity and acting upon the gyroscope to maintain its position with relation to the earth, and means for adjusting said gravity affected means whereby the position of the gyroscope may be varied with relation to the earth, said adjusting means being adjustable while the airplane is in flight and while the gyroscope is operatively connected to said control member.

8. The combination with an airplane having means to control the lateral and longitudinal movements thereof, of a gyroscope connected to actuate said control means, means affected by gravity and acting upon the gyroscope to maintain its position with relation to the earth, and means to prevent the action of centrifugal force from affecting said gravity affected means.

9. The combination with an airplane having means to control the lateral and longitudinal movements thereof, of a gyroscope connected to actuate said control means, means affected by gravity and acting upon the gyroscope to maintain its position with relation to the earth, and adjustable means by which the relative positions of the gyroscope and the control means may be varied.

10. The combination with an airplane, of a gyroscope mounted therein for universal swinging movement, a control lever extending through the axis of the gyroscope and connected with means on the airplane for controlling its lateral and longitudinal movements, and means for connecting said control lever to said gyroscope whereby said control lever is automatically actuated by the gyroscope said connecting means being adjustable whereby the relative position of the control lever and gyroscope may be varied.

11. The combination with an aircraft having means operable to control the lateral and longitudinal movements thereof, of a gyroscope and means for connecting said gyroscope to said control means whereby the gyroscope will automatically hold the control means, one set of means affected by gravity and acting upon the gyroscope to maintain its position about a certain vertical plane in fixed relation to the earth and another set of means affected by gravity and acting upon the gyroscope to maintain its position about a vertical plane at right angles to the aforesaid vertical plane in fixed relation to the earth.

12. The combination with an aircraft having means to control its equilibrium, of a gyroscope connected to actuate said control means, means affected by gravity and acting upon the gyroscope to maintain its position with relation to the earth, and means for adjusting said gravity affected means whereby the position of the gyroscope may be varied with relation to the earth.

13. The combination with an aircraft having means to control its equilibrium, of a gyroscope connected to actuate said control means, means affected by gravity and acting upon the gyroscope to maintain its position with relation to the earth, and means for adjusting said gravity affected means whereby the position of the gyroscope may be varied with relation to the earth, said adjusting means being adjustable while the airplane is in flight and while the gyroscope is operatively connected to said control member.

14. The combination with an aircraft having means to control its equilibrium, of a gyroscope connected to actuate said control means, means affected by gravity and acting upon the gyroscope to maintain its position with relation to the earth, and means to prevent the action of centrifugal force from affecting said gravity affected means.

15. The combination with an aircraft having means to control its equilibrium, of a gyroscope and means for connecting said gyroscope to said control means whereby the gyroscope will automatically hold the control means, one set of means affected by gravity and acting upon the gyroscope to maintain its position about a certain vertical plane in fixed relation to the earth and another set of means affected by gravity and acting upon the gyroscope to maintain its position about a vertical plane at right angles to the aforesaid vertical plane in fixed relation to the earth.

16. The combination with an airplane of a gyroscope mounted therein, a control lever connected with means on the airplane for controlling the movements thereof, said control lever extending through the axis of the gyroscope and means for connecting the control lever to the gyroscope whereby the control lever is automatically actuated by the gyroscope.

GARFIELD A. WOOD.